(12) United States Patent
Ressler

(10) Patent No.: US 10,704,648 B2
(45) Date of Patent: Jul. 7, 2020

(54) TENSION FASTENER FOR USE WITH LOOPED WEBBING

(71) Applicant: Dutch Clips LLC, Reinholds, PA (US)

(72) Inventor: Thomas Ressler, Reinholds, PA (US)

(73) Assignee: Dutch Clips LLC, Reinholds, PA (US)

( * ) Notice: Subject to any disclaimer, the term of this patent is extended or adjusted under 35 U.S.C. 154(b) by 0 days.

(21) Appl. No.: 16/196,734

(22) Filed: Nov. 20, 2018

(65) Prior Publication Data
US 2020/0158207 A1    May 21, 2020

(51) Int. Cl.
*F16G 11/14* (2006.01)
*F16G 11/12* (2006.01)
*A44B 11/04* (2006.01)

(52) U.S. Cl.
CPC .............. *F16G 11/14* (2013.01); *F16G 11/12* (2013.01); *A44B 11/04* (2013.01)

(58) Field of Classification Search
CPC ..... A44B 11/12; A44B 11/14; Y10T 24/4736; Y10T 24/4745; Y10T 24/4764; Y10T 24/4093; Y10T 24/314; Y10T 24/316; Y10T 24/318; Y10T 24/3916; Y10T 24/3918; Y10T 24/3924; Y10T 24/4091; Y10T 24/3485; Y10T 24/4755; A45F 5/1026; A45F 5/104; A45F 5/102; A45F 2005/1033; A45F 2005/104
USPC .................................................. 24/197, 200
See application file for complete search history.

(56) References Cited

U.S. PATENT DOCUMENTS

| | | | |
|---|---|---|---|
| D56,993 S | 1/1921 | Robinson | |
| 1,485,266 A * | 2/1924 | Hennah | D06F 55/00 24/200 |
| 1,803,214 A | 4/1931 | Siegel | |
| 2,142,645 A | 1/1939 | Hall | |
| 2,650,401 A | 9/1953 | La Mond | |
| 2,707,052 A | 4/1955 | Clark | |
| D269,389 S | 6/1983 | Wood | |
| D335,083 S | 4/1993 | Russell et al. | |
| 5,427,562 A | 6/1995 | Hwang | |
| 5,881,436 A * | 3/1999 | Lyons | F16L 3/233 24/16 R |
| D418,449 S | 1/2000 | Lawrence, Jr. | |
| D420,335 S | 2/2000 | Salas et al. | |
| D426,425 S | 6/2000 | Hermanski | |
| D478,738 S | 8/2003 | Workman | |
| D536,638 S | 2/2007 | Fildan et al. | |
| D540,153 S | 4/2007 | Tanaka et al. | |
| D578,383 S | 10/2008 | Adams | |
| D592,508 S | 5/2009 | Perignon | |

(Continued)

FOREIGN PATENT DOCUMENTS

FR    2563093 A1    10/1985

OTHER PUBLICATIONS

Abstract of FR 2563093 A1, dated Oct. 25, 1985, 1 page.

(Continued)

*Primary Examiner* — Robert Sandy
(74) *Attorney, Agent, or Firm* — Barley Snyder

(57) ABSTRACT

A tension fastener system is provided and includes a plurality of fastener bodies and tie materials. The fastener body includes a head with a webbing strap receiving passageway extending there through from lateral sides thereof, and a distal end having arms positioned opposite the proximal end and a securing feature section on each arm.

8 Claims, 3 Drawing Sheets

(56) References Cited

U.S. PATENT DOCUMENTS

| | | | |
|---|---|---|---|
| D597,828 S | 8/2009 | Tanaka et al. | |
| D608,189 S | 1/2010 | Jackson et al. | |
| 7,849,568 B2 * | 12/2010 | Wilkinson | B65H 75/366 |
| | | | 24/298 |
| D649,792 S | 12/2011 | Nosworthy | |
| D687,347 S | 8/2013 | Gillan | |
| D690,191 S | 9/2013 | Takakuwa et al. | |
| D696,576 S | 12/2013 | Ng | |
| 8,720,846 B2 | 5/2014 | Wohlford et al. | |
| D739,302 S | 9/2015 | Nilsen et al. | |
| D749,461 S | 2/2016 | Wong | |
| 9,717,308 B2 | 8/2017 | Bowerman | |
| 2002/0148079 A1 | 10/2002 | Morris | |
| 2004/0006853 A1 | 1/2004 | Yang | |
| 2007/0114340 A1 | 5/2007 | Adams | |
| 2013/0221052 A1 | 8/2013 | Shereyk et al. | |
| 2016/0095406 A1 | 4/2016 | Bowerman | |

OTHER PUBLICATIONS

The Conservation of Plastics—The Plastics Historical Society plastiquarian.com/?page_id=14326, downloaded Mar. 2, 2020, 12 pages.

* cited by examiner

TENSION FASTENER FOR USE WITH LOOPED WEBBING

FIELD OF THE INVENTION

The invention relates to a tension fastener system and, more particularly, to a tension fastener system connecting two points to support a load.

BACKGROUND

Tools for securing strapping between two objects or between two points of attachment are of interest in many applications. In particular, there is a need for a tool and system to quickly set, maintain, adjust, or release tension in strapping and cordage used for camping equipment, such as for backpacks, tarpaulins (tarps), hammocks, flys, tents and similar shelters, or other structures.

While tools to set, maintain, adjust, and release tension in strapping and lines are known, these known tools are generally bulky, weighty, and cumbersome, and often include various catches, eyes, cleats, grips, pulleys, and the like, which require multiple knots to function. Cleats and grips can abrade or damage strapping and other tie materials used to suspend loads.

SUMMARY

In light of the shortcomings of the prior art and to solve a long felt need, the present invention was made in view of the above-mentioned issues and is directed toward a fastener system used to support and maintain tension with hammocks and other loads. The fastener is specifically designed to work with variations of daisy chain webbing, a two-layered webbing or strapping having spaced loops positioned along its length.

BRIEF DESCRIPTION OF THE DRAWINGS

The invention will now be described by way of example with reference to the accompanying figures, wherein like reference numerals designate like structural elements, and in which.

DETAILED DESCRIPTION OF THE EMBODIMENT(S)

Embodiments of the invention will now be described in greater detail with reference to the accompanying drawings.

Figure 1:
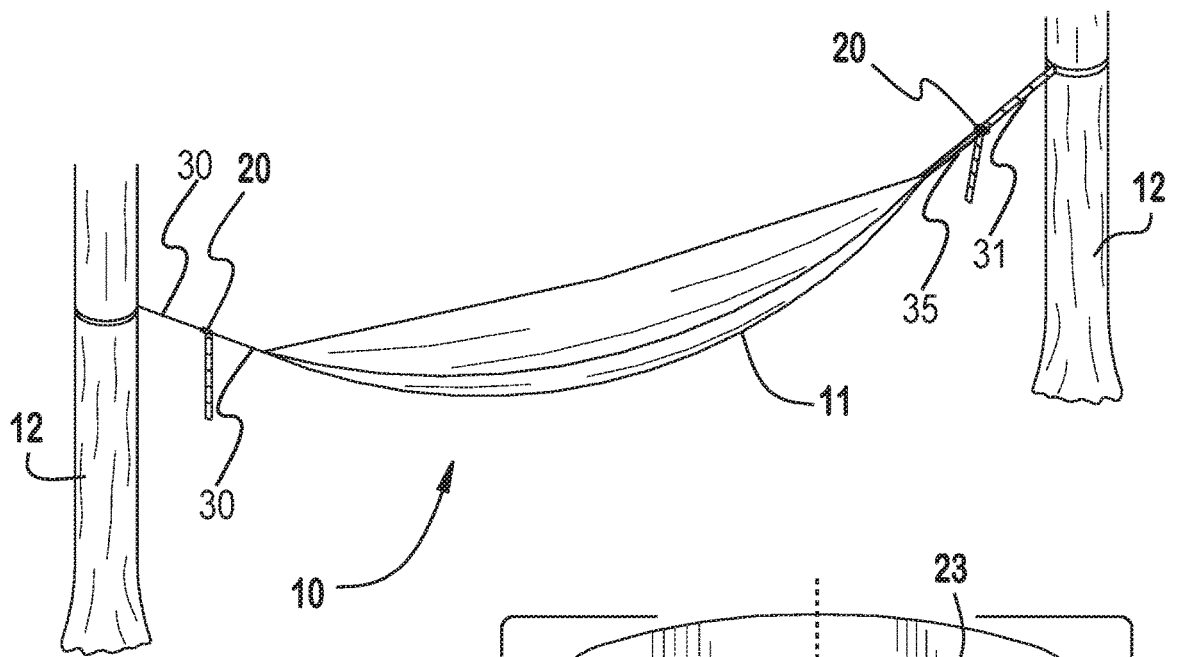
FIG. 1 shows a perspective view of a fastener system according to the invention and shown in use with a known hammock.
Figure 2:
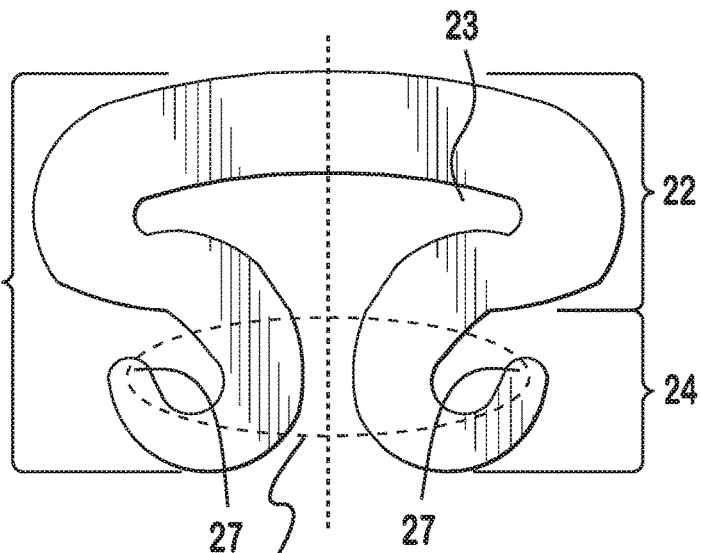
FIG. 2 is a top view of a fastener according to the invention.
Figure 3:
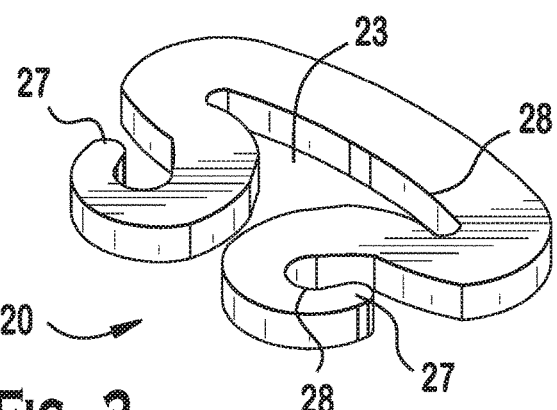
FIG. 3 is a perspective view of the fastener of FIG. 2.
Figure 4:
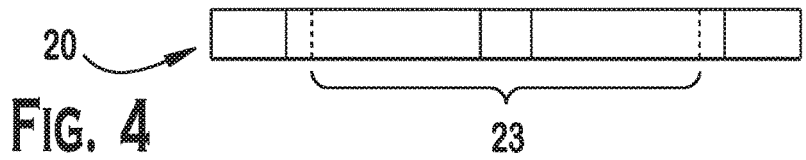
FIG. 4 is a front view of the fastener of FIG. 2.
Figure 5:
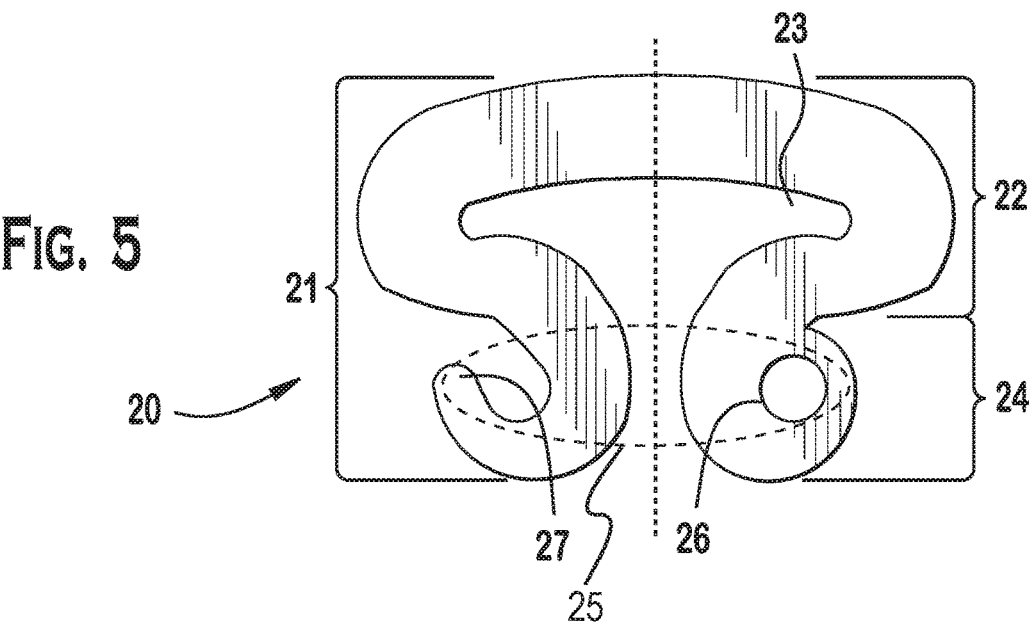
FIG. 5 is a top view of another fastener according to the invention.
Figure 6:
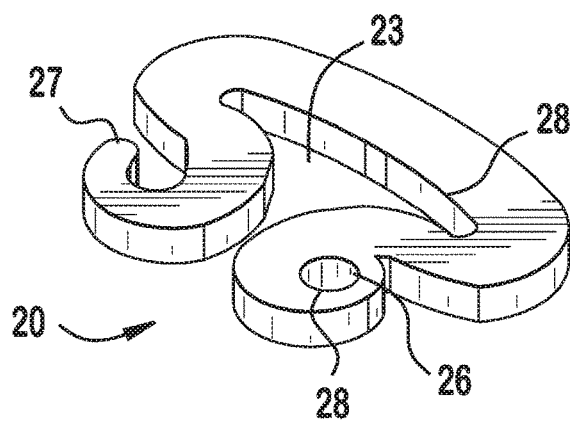
FIG. 6 is a perspective view of the fastener of FIG. 5.
Figure 7:
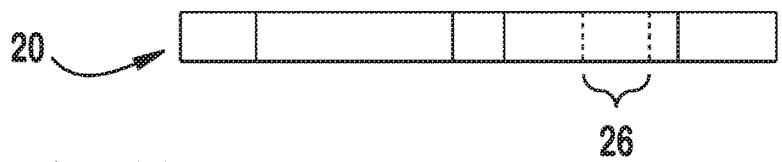
FIG. 7 is a front view of the fastener of FIG. 5.

With reference to FIG. 1, a tension fastener system 10 according to an exemplary embodiment is shown and is generally referred to by reference numeral 10.

As shown in FIGS. 1-8, the fastener system 10 generally includes a fastener 20 and known tie materials 30.

As shown in FIG. 1, when assembled and installed, the fastener system 10 holds a hammock 11 or other load in a desired position between first and second supports 12 using a plurality of fasteners 20 and tie materials 30.

FIGS. 2-8 feature elements of the fastener system 10 useful, in all embodiments, for securing a weight or load with fasteners 20 engaged with tie materials 30.

As shown in FIGS. 2-8, the fastener 20 in the shown embodiments is a shaped article having a rectangular cross section and two major planar surfaces positioned opposite and generally parallel to one another. The fastener 20 includes a fastener body 21, a proximal head 22, including a strap-receiving passageway 23, and distal arms 24, each arm 24 including at least one securing feature 25. The at least one securing feature 25 may, more particularly, be a catch section 27 or a line-receiving passageway 26. The embodiments illustrated herein show the invention with 1) an embodiment having a catch section 27 on each arm 24 (FIGS. 2-4 and 8) and 2) an embodiment having a catch section 27 on one arm 24 and a line-receiving passageway 26 on the other arm 24 (FIGS. 5-7 and 8).

The strap-receiving passageway 23 is an "elongated, oval-shaped opening" extending through the fastener head 22 cross-wise to the central longitudinal axis. As used herein, an "elongated, oval-shaped opening" describes the strap-receiving passageway 23: a hollow tube with straight sides and cross sections that are shaped like a flattened oval that is longer than it is wide or deep and that opens distally to the head 22. This strap-receiving passageway 23 is sized to accommodate a webbing or strap 31 as is described in more detail below.

The line securing projections 25 include a line-receiving passageway 26 and a catch section 27. The line-receiving passageway 26 is a cylindrically-shaped opening extending through arm 24 perpendicular to the central axis. As used herein, a "cylindrically-shaped opening" describes the line-receiving passageway 26: a hollow tube with straight sides and cross sections that are circular.

The catch section 27 is a variation on the line-receiving passageway 26 wherein a portion of the passageway is open and facing away from the center longitudinal axis and toward the head 22. The opening is positioned and sufficient to receive and retain a line 35 and also allow the removal of the line 35 from the catch section 27. The opening of the catch section 27 is approximately between a quarter and a third of the circumference of the passageway.

The fastener 20 is sized to receive a strap 31 engaged in the strap-receiving passageway 23 of the fastener body 21. The fastener 20 is sized to receive a line 35 in a line-receiving passageway 26 or in a catch section 27.

In the shown embodiments, edges 28 of the fastener 20 are preferably beveled or softened from a 90° angle along a perimeter thereof and, more particularly, at the strap-receiving passageway 23 and at the line-securing features 25 (line-receiving passageway 26 and catch section 27) in order to avoid wear or abrasion on the strap 31 or the line 35 passing over the beveled edge 28.

Figure 8:
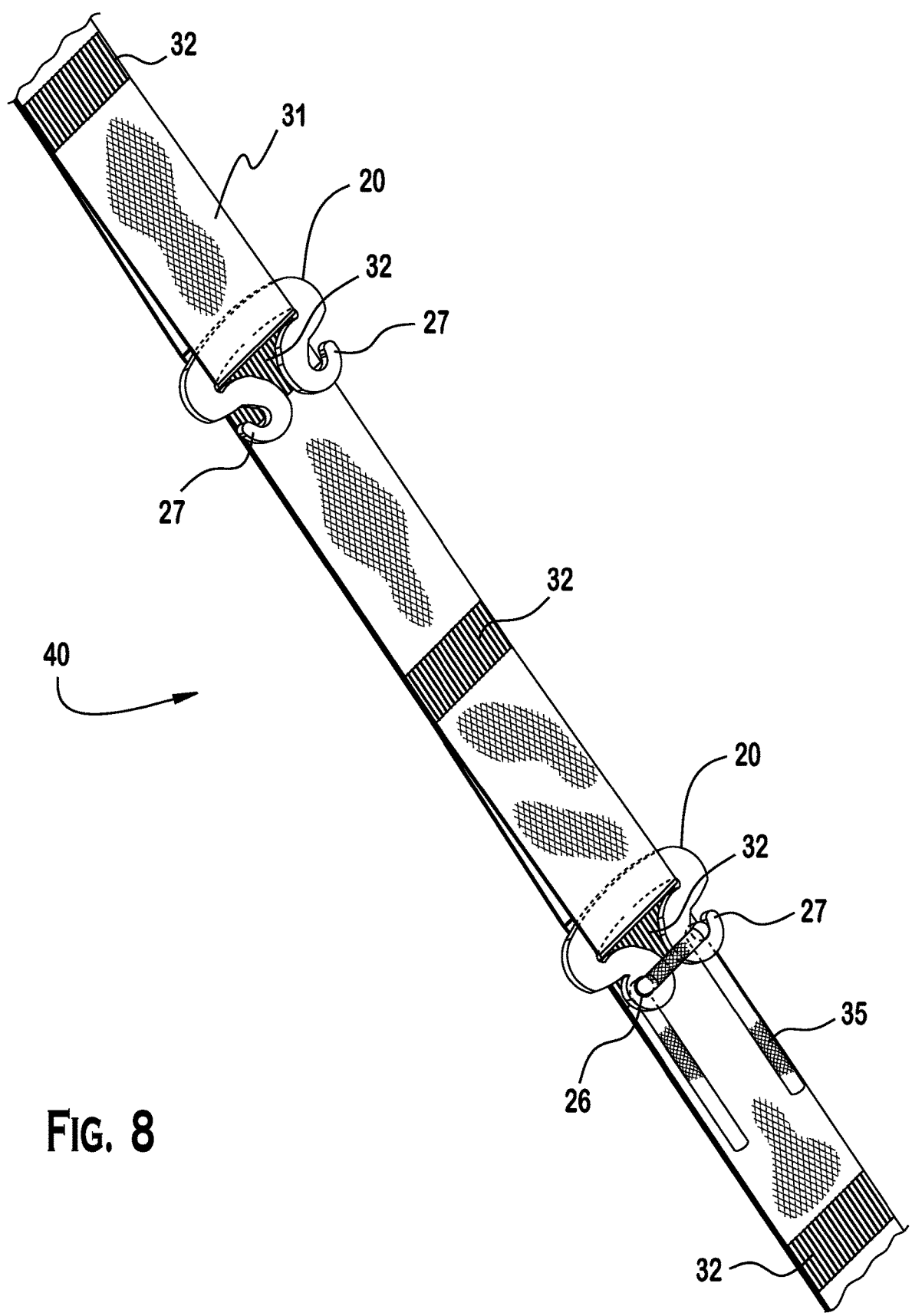
FIG. 8 is a top perspective view of both embodiments of the fastener engaged with a looped strap and lines.

In an exemplary embodiment, the fastener 20 is sized for straps one inch in width and constructed in a "daisy chain" configuration. "Daisy chain" configuration is illustrated in FIG. 8 wherein the strap is composed of two layers joined or secured together at regular intervals along the lengthwise dimension. The layers are secured to each other at a juncture 32 in various ways including by stitching across the width of the strap or by interwoven manufacturing.

The fastener 20 is sized at its securing features 25 for 3/32" to 1/8" static (non-stretch) cord as is typically used in camping equipment.

The fastener 20 is not limited for use with any specifically sized support material as it is expected that the fastener 20 may be scaled larger or smaller to accept tie materials 30 of different diameters or width for use in different applications. The operation of such relatively larger or smaller fastener 20 will be the same regardless of the specific application.

Referring back to FIG. 1, use of the fastener system 10 will be described. In general, the subject matter of the invention provides a relatively lighter tool as compared with a carabineer to secure comparable loads.

The fastener 20 is generally used to maintain tension on the tie materials 30 that restrain a hammock 11 or other weight or load in a substantially linear orientation relative to a longitudinal axis between two supports 12.

As shown in FIG. 1, to use the invention, a site is selected that will allow for the fastener system 10 including a hammock 11 to be positioned between supports 12. The selected site offers a spatial arrangement that provides a substantially unobstructed space in which to set the hammock 11 to a desired length and tension and at a desired height above the ground. In the illustrated embodiment of FIG. 1, the supports 12 are living trees. It is preferable that living trees are at least 8 inches in diameter or adjudged to be sufficiently strong to bear the weight of the load to be suspended. Alternative supports or anchor points from which to suspend the fastener system 10 include structurally strong living and dead tree branches and trunks, boulders, rock faces, flag or light poles, walls, rafters, railings, beams, and other points that can support a weight of several hundred pounds without structural failure. A support 12 may be vertical to the ground, such as a tree, post, or similar element. Alternatively, a support 12 may be horizontal relative to the ground, such as a branch or a stationary railing. Also, a support 12 may include hardware attached to a vertical or horizontal support.

As shown in FIG. 1, the hammock 11 is positioned between first and second supports 12 using straps 31, lines 35, and fasteners 20.

Line 35 is secured to hammock 11 or other load by various methods known to those of skill in the art. The particular connection of line 35 is determined by the configuration of the specific hammock or load to be suspended. The portion of hammock 11 to which line 35 will be attached (not shown in detail) may be in the form of a bridge structure or a gathered end. One skilled in the art would appreciate that the shape, size, and material of the hammock 11 can be modified and designed for a particular use. When the fastener 20 is so arranged within a loop of strap 31 and against the juncture 32, the strap 31 is prevented from slipping through the fastener strap-receiving passageway 23. This is termed the "locked position" for the strap 31.

The strap 31 is secured about support 12 by means of knots or, preferably, a looped end formed in a second end of the strap 31. Such webbing straps 31 are known as "tree huggers" or "tree straps" and help reduce abrasion or damage to the tree surface from the suspended weight or load. The lengths of strap 31 are sized to adequately encircle a tree and support the hammock 11 or other load. Additional accessory materials (i.e., tubing, padding) may also be used to maintain the strap 31 in position and to distribute the pressure and load placed by the hammock 11 on the support 12.

As shown in FIGS. 1 and 8, a first layer of strap 31 is arranged within receiving passageway 23 of the fastener 20.

The fastener 20 rests adjacent to the juncture 32 of the first and second layers of the strap 31. Strap 31 is prevented from slipping through the fastener strap receiving passageway 23 by the juncture 32 of the two layers of strapping. In this "locked" position, the weight is adjustably fixed in placed. Line 35 is coupled to fastener 20 by being threaded through line-receiving passageway 26 (as shown in FIG. 8) or by being secured about catch section(s) 27 (as shown in FIG. 8).

Fastener 20 is secured to the strap 31 and to line 35 as set out as above on each end of the hammock 11 (or other load). The overall length of the span between the two supports 12 is adjusted to the desired length and tension to use the hammock 11 by adjusting the position of fastener 20 along the strap 31 and/or adjusting the strap 31 at its "tree hugger" end.

The strap 31 and line 35 are selected to possess characteristics of strength and durability suitable for the tension and weight to be secured.

In the shown embodiments, the fastener 20 is made from a rigid material, such as titanium, aluminum, steel, or plastic. One embodiment of the fastener 20 is manufactured to have a weight rating of 300 pounds. Preferably, the fastener 20 is made from titanium or aluminum. In the shown embodiments, the fastener 20 is a solid monolithic piece of material. However, one skilled in the art would appreciate that the fastener 20 may be prepared from a variety of structural materials including an alloy of metals, a polymer, a composite, or other compatible and suitable material known in the art. The choice of the solid structural material is influenced by the material's weight, durability, cost, and the load it will be supporting. Further, one skilled in the art would appreciate that the fastener 20 may be hollow.

The fastener 20 is manufactured through machining, but could be manufactured using forging, casting, stamping, or through another method known to one of skill in the art, and consistent with the chosen material to achieve the desired strength of the fastener for its intended use. For instance, the components of fastener 20 made of polymer could be manufactured using injection molding.

Choices of material suitable to a particular application are a flexible strap, webbing, or ribbon (hereinafter referred to generally as "strap") or a flexible, linear element such as a cord, cable, line, rope, string, or twine (hereinafter referred to generally as "line"). The strap 31 has a substantially rectangular cross-section; its width is substantially greater than its height and its overall dimensions and material properties are suitable for the weight to be secured and conditions of use. The line 35 has a substantially circular cross-section and its diameter, length, and material properties are selected to be suitable for the weight to be secured and conditions of use.

The strap 31 and the line 35 are made of various materials including woven, braided, or twisted nylon or other plastic polymer, natural fibers, such as hemp or silk, and other such material used by those of skill in the art to secure weights or loads. Preferably, tie materials 30 selected to use with the fastener system 10 are characterized by low stretch, abrasion resistance, light resistance, high strength, and highly durability and are light in weight.

Preferably, the tie materials 30 selected to use with the fastener 20 are made of an ultrahigh molecular weight polyethylene (UHMwPE) fiber. This type of fiber is alternatively referred to as high-modulus polyethylene (HMPE) and high-performance polyethylene (HPPE). This type of line features light weight, high strength, high durability, and has a surface texture conducive to maintaining a tension suitable for securing a hammock or other load. One commercially available fiber suitable for use with the device is Dyneema®. However, such high performance strap or line is not required as the fastener 20 may be used with any material that is appropriate for the weight to be secured and the particular embodiment of the invention. An alternative choice of fiber for line 35 is a lightweight nylon kernmantle rope, also referred to as parachute cord. A further alternative choice of fiber can be a monofilament line. The tie materials 30 are sized to meet the use and dimensions of the devices 11. In an exemplary embodiment, the fastener is sized for 3/32" to 1/8" static (non-stretch) line (Exemplary dimensions of lines: 7/64 Amsteel® loop; 1/8 Amsteel® Loop), but is not limited for use with any specific sized tie material. In applications of the fastener 20, a user should not attempt to secure a load heavier than what the chosen tie material 14 can support.

A kit 40 comprising a plurality of fasteners 20, of straps 31, and of lines 35 is one embodiment of the invention. One embodiment of the kit includes fasteners 20, lengths (for example, 8 and 15 feet) of dual-layered polyester webbing straps 31 with regularly spaced intervals of stitching (for example, a juncture at every 3 inches) within which to engage the fasteners 20. Various types of lines 35 (i.e., in pre-spliced continuous loops on fasteners 20 through line-receiving passageways 27 or non-looped lines 35) may be included in a kit 40.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents. One skilled in the art would appreciate that other design are possible without departing from the spirit of the invention.

What is claimed is:

1. A fastener comprising:
   a rigid fastener body having:
      a proximal head with a strap-receiving passageway extending there through cross-wise to a central longitudinal axis of the body; and
      a distal pair of arms positioned opposite the proximal head and spaced from one another by an opening in communication with the strap-receiving passageway, each arm terminating in a line-securing feature, the rigid material suitable to the load to be supported and chosen from the group consisting of titanium, aluminum, steel and alloys thereof.

2. The fastener of claim 1, wherein a first layer of a two layered strap is positioned through the strap-receiving passageway.

3. The fastener of claim 1, wherein the line-securing feature is a line-receiving passageway through the fastener body from lateral sides thereof.

4. The fastener of claim 1, wherein the line-securing feature is a catch section.

5. The fastener of claim 4, wherein the catch section is positioned outward from the central longitudinal axis of the body and is open toward the proximal head of the fastener body.

6. The fastener of claim 1, wherein the fastener body is titanium.

7. The fastener of claim 1, wherein the fastener body has beveled edges.

8. A kit comprising:
   a plurality of rigid fasteners each having a rigid body having a proximal head with a strap-receiving passageway extending there through cross-wise to a central longitudinal axis of the body, the rigid material suitable to the load to be supported and chosen from the group consisting of titanium, aluminum, steel, and alloys thereof;
   a distal pair of arms positioned opposite the proximal head and spaced from one another by an opening in communication with the strap-receiving passageway, each arm terminating in a line-securing feature; and
   a plurality of straps composed of two layers joined or secured together laterally at regular junctures; and a plurality of lines.

* * * * *